United States Patent
Shima et al.

(10) Patent No.: US 9,400,506 B2
(45) Date of Patent: Jul. 26, 2016

(54) PRESSURE REDUCER

(75) Inventors: Toshihiko Shima, Okazaki (JP); Hidetoshi Fujiwara, Aichi-ken (JP); Munetoshi Kuroyanagi, Okazaki (JP); Takuya Suzuki, Anjo (JP); Tsukuo Ishitoya, Toyota (JP); Akira Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 431 days.

(21) Appl. No.: 11/722,837

(22) PCT Filed: Dec. 26, 2005

(86) PCT No.: PCT/JP2005/024208
§ 371 (c)(1),
(2), (4) Date: Jun. 26, 2007

(87) PCT Pub. No.: WO2006/070909
PCT Pub. Date: Jul. 6, 2006

(65) Prior Publication Data
US 2008/0202603 A1 Aug. 28, 2008

(30) Foreign Application Priority Data
Dec. 27, 2004 (JP) .................................. 2004-377107

(51) Int. Cl.
G05D 16/10 (2006.01)

(52) U.S. Cl.
CPC .............. *G05D 16/10* (2013.01); *G05D 16/106* (2013.01); *Y10T 137/7793* (2015.04); *Y10T 137/7794* (2015.04); *Y10T 137/7826* (2015.04)

(58) Field of Classification Search
CPC .................... Y10T 137/7793; Y10T 137/7826; Y10T 137/7794; G05D 16/10; G05D 16/106

USPC ...................... 137/505, 505.42; 277/438, 554
See application file for complete search history.

(56) References Cited

U.S. PATENT DOCUMENTS 2,855,226 A * 10/1958 Payne ............................ 277/374
3,046,621 A * 7/1962 Morton .......................... 92/128
(Continued)

FOREIGN PATENT DOCUMENTS

DE         37 15 607 A1    3/1988
DE    11 2005 003 291 T5   3/2008
(Continued)

OTHER PUBLICATIONS

Office Action issued Oct. 12, 2012, in German Patent Application No. 11 2005 003 291.4 (with English-language Translation).
(Continued)

*Primary Examiner* — William McCalister
(74) *Attorney, Agent, or Firm* — Oblon, McClelland, Maier & Neustadt, L.L.P.

(57) ABSTRACT

A pressure reducer includes a piston slidably accommodated in a cylinder to define a decompression chamber and a pressure adjusting chamber. A seal member includes an elastic member and a sliding portion. The sliding portion is pressed by the elastic member such that the sliding portion slides on an inner circumferential surface of the cylinder. An annular member is located on an outer circumferential surface of the piston and between the seal member and the pressure adjusting surface. The annular member is pressed against the inner circumferential surface of the cylinder with a force that is less than a force with which the sliding portion is pressed against the inner circumferential surface of the cylinder. Thus, the pressure reducer prevents the piston from being moved by an excessive amount with highly accurately adjusting pressure.

19 Claims, 2 Drawing Sheets

(56) References Cited

U.S. PATENT DOCUMENTS

| | | | | |
|---|---|---|---|---|
| 3,240,223 | A | * | 3/1966 | Vander Horst ............. 137/116.5 |
| 3,285,632 | A | * | 11/1966 | Dunkle ..................... 285/363 |
| 4,693,267 | A | * | 9/1987 | Patterson ................. 137/116.5 |
| 4,826,181 | A | * | 5/1989 | Howard ..................... 277/539 |
| 5,163,692 | A | * | 11/1992 | Schofield et al. ........... 277/436 |
| 5,452,741 | A | * | 9/1995 | Tomita et al. ............ 137/505.26 |
| 5,799,953 | A | * | 9/1998 | Henderson ................. 277/554 |
| 6,161,573 | A | * | 12/2000 | Sheng .................... 137/505.41 |
| 2004/0007261 | A1 | | 1/2004 | Cornwell |

FOREIGN PATENT DOCUMENTS

| | | |
|---|---|---|
| JP | 61-57270 | 4/1986 |
| JP | 1 178285 | 12/1989 |
| JP | 3 219174 | 9/1991 |
| JP | 7-41605 | 7/1995 |
| JP | 7-167306 | 7/1995 |
| JP | 10-167 | 8/1998 |
| JP | 10 306879 | 11/1998 |
| JP | 11-270716 | 10/1999 |
| JP | 2000 179722 | 6/2000 |
| JP | 2000 249001 | 9/2000 |
| JP | 2004 192462 | 7/2004 |
| WO | 88 05159 | 7/1988 |
| WO | 98 30859 | 7/1998 |
| WO | 2004 053613 | 6/2004 |

OTHER PUBLICATIONS

DE Office Action dated Oct. 20, 2014, in German Patent Application No. 11 2005 003 291.4 (with English language translation).

* cited by examiner

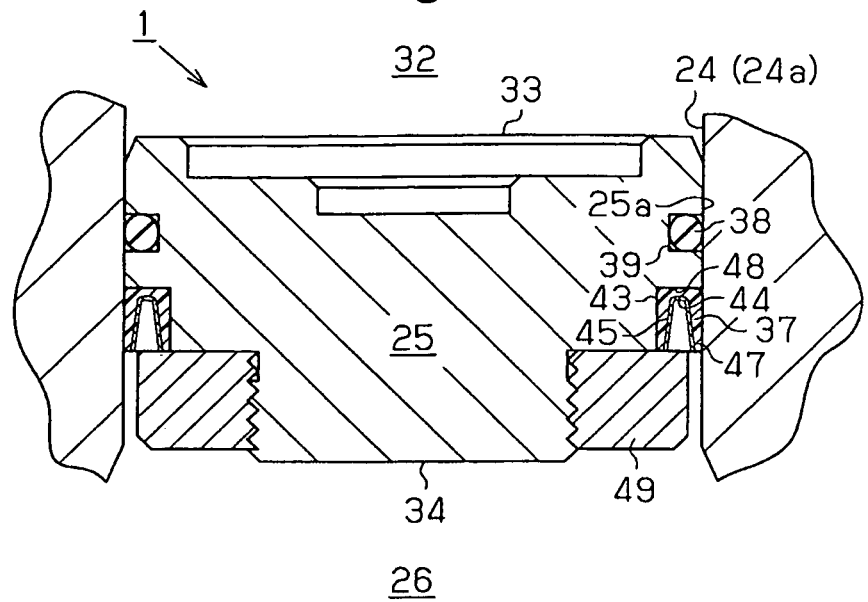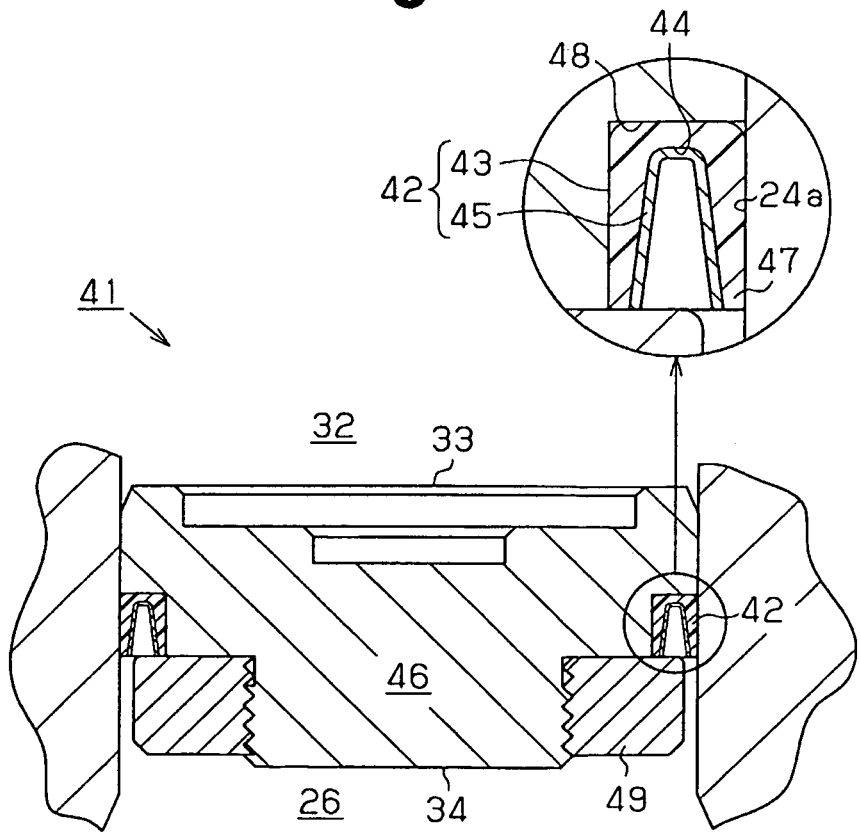

and claims priority to JP 2004-377107 filed on Dec. 24, 2004, and the complete disclosure of each of which is incorporated into this application by reference.

PRESSURE REDUCER

CROSS-REFERENCE TO RELATED APPLICATIONS

This is a National Stage entry of International Application PCT/JP2005/024208, with an international filing date of Dec. 26, 2005, which was published as WO2006/070909 A1, and claims priority to JP 2004-377107 filed on Dec. 24, 2004, and the complete disclosure of each of which is incorporated into this application by reference.

FIELD OF THE INVENTION

The present invention relates to a pressure reducer used for adjusting the pressure of high-pressure gas such as hydrogen gas in a fuel-cell vehicle.

BACKGROUND OF THE INVENTION

In general, a pressure-reducer (regulator) has a valve located between a primary port to which high pressure gas flows in and a secondary port for supplying gas to the outside. The valve is opened and closed so that the pressure (primary pressure) of high-pressure gas flowing into the primary port is reduced to a secondary pressure before the gas is supplied to the outside.

Such pressure reducers include piston type pressure reducers (for example, see Japanese Laid-Open Patent Publication No. 2004-192462). A piston type pressure reducer has a cylinder located downstream of a valve and a piston slidably accommodated in the cylinder. The piston separates a decompression chamber and a pressure adjusting chamber from each other. The valve is opened or closed based on the movement of the piston in accordance with the difference between the force received by the pressure adjusting chamber and the force received by the decompression chamber.

In such a piston type pressure reducer, a seal member is provided on the outer circumferential surface of the piston for sealing the decompression chamber and the pressure adjusting chamber from each other to maintain the hermeticity. In many cases, an O-ring is used as such a seal member.

In recent years, to increase storage capacity of hydrogen tanks used for fuel cell vehicles, the pressure in these tanks are more and more increased (for example, to 70 MPa). Accordingly, the pressure receiving surface of the above described piston, or the surface exposed to the decompression chamber, and the seal member receive extremely high gas pressure. To obtain a sufficient sealing performance of an O-ring in a conventional pressure reducer, the compressibility of the O-ring needs to be inevitably significantly high. As a result, due to an increased friction between the O-ring and the inner circumferential surface of the cylinder, the movement of the piston is hindered.

SUMMARY OF THE INVENTION

Accordingly, it is an objective of the present invention to provide a pressure reducer that is capable of highly accurately adjusting pressure.

To achieve the foregoing and other objectives and in accordance with the purpose of the present invention, a pressure reducer for reducing a pressure of high-pressure gas flowing in through a first port and sending the gas to a second port is provided. The pressure reducer includes a valve located between the first port and the second port, a cylinder located downstream of the valve, a piston slidably accommodated in the cylinder to define a decompression chamber and a pressure adjusting chamber, and an annular seal member. The piston has a pressure receiving surface exposed to the decompression chamber and a pressure adjusting surface exposed to the pressure adjusting chamber. Gas can flow into the decompression chamber from the first port through the valve. The piston moves in the cylinder according to the difference between a force received by the pressure receiving surface and a force received by the pressure adjusting surface, thereby selectively opening and closing the valve. The annular seal member is provided on the outer circumferential surface of the piston. The seal member includes an elastic member and a sliding portion. The sliding portion is pressed by the elastic member such that the sliding portion slides on the inner circumferential surface of the cylinder. An annular member is located on the outer circumferential surface of the piston and between the seal member and the pressure adjusting surface. The annular member slides on the inner circumferential surface of the cylinder. The annular member has elasticity. The annular member is pressed against the inner circumferential surface of the cylinder with a force that is less than a force with which the sliding portion is pressed against the inner circumferential surface of the cylinder.

BRIEF DESCRIPTION OF THE DRAWINGS

The invention, together with objects and advantages thereof, may best be understood by reference to the following description of the presently preferred embodiments together with the accompanying drawings in which:

FIG. 2 is a partial cross-sectional view of the pressure reducer of FIG. 1, illustrating a section including the piston and FIG. 3 is a partial cross-sectional view illustrating a comparison example of a pressure reducer.

DETAILED DESCRIPTION OF THE PREFERRED EMBODIMENTS

Figure 1:
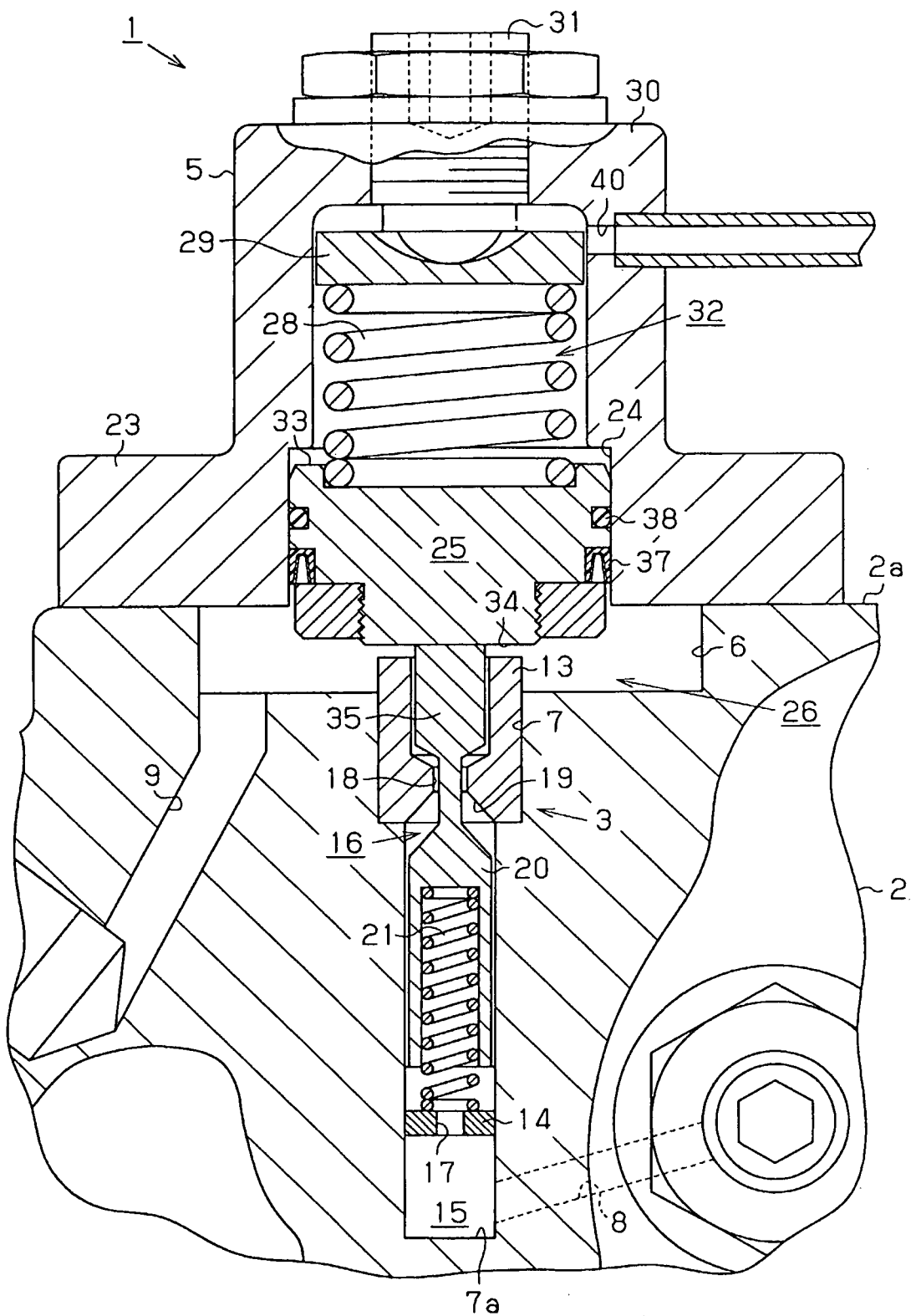
FIG. 1 is a cross-sectional view illustrating a pressure reducer according to a present embodiment.

Hereinafter, a preferred embodiment according to the present invention will be described.

As shown in FIG. 1, a pressure reducer 1 of this embodiment is a pressure reducer (regulator) for a high-pressure hydrogen tank. The pressure reducer 1 is provided in a plug housing 2 that closes an opening of the hydrogen tank. The pressure reducer 1 includes a valve mechanism 3 formed in the plug housing 2 and an outer housing 5 that closes an opening of the plug housing 2.

The plug housing 2 has a first recess 6 and a second recess 7. The second recess 7 is located in a center of the first recess 6 and is deeper than the first recess 6. An admission passage 8 opens to a section of the side wall of the second recess 7 in the vicinity of a bottom 7a of the second recess 7. The admission passage 8 communicates with the interior of the hydrogen tank. An outflow passage 9 opens to the bottom of the first recess 6. The outflow passage 9 communicates with an outlet port. In this embodiment, the admission passage 8 forms a primary port, and the outflow passage 9 forms a secondary port.

A cylindrical lid 13 is fixed to an open end of the second recess 7. A bottom member 14 is provided in the second recess 7 in the vicinity of the bottom. A space between the bottom member 14 and the bottom 7a of the second recess 7 forms a primary pressure chamber 15, while a space between the lid 13 and the bottom member 14 of the second recess 7 forms a valve chamber 16.

The bottom member 14 has a through hole 17 that connects the primary pressure chamber 15 with the valve chamber 16. Hydrogen gas that flows into the primary pressure chamber 15 through the admission passage 8 flows to the valve chamber 16 through the through hole 17. The diameter of a part of the inner circumferential surface of the lid body 13 is reduced, and a small-diameter through hole 18 is formed in the reduced diameter portion. A valve seat 19 is formed in a section of the through hole 18 closer to the valve chamber 16. A valve body 20 is accommodated in the valve chamber 16. The valve body 20 selectively contacts and separates from the valve seat 19. In this embodiment, the valve body 20 is urged by elastic force of a valve spring 21 in a direction approaching the valve seat 19. As the valve body 20 separates from the valve seat 19, hydrogen gas in the valve chamber 16 flows to the first recess 6 through the through hole 18. As the valve body 20 contacts the valve seat 19, the flow of hydrogen gas is stopped. That is, in this embodiment, the valve body 20 and the valve seat 19 form a valve.

On the other hand, the outer housing 5 is formed as a cylinder with a bottom and a flange 23. The flange 23 is formed at the open end and extends radially outward. The outer housing 5 is fixed to the open end of the first recess 6 by fastening the flange 23 to an outer surface 2a of the plug housing 2, so that the opening of the first recess 6 is closed.

A cylinder 24 is formed in the opening portion of the outer housing 5. A piston 25 is slidably accommodated in the cylinder 24. The cylinder 24 is formed to be coaxial with the lid body 13. The piston 25 defines the interior space of the outer housing 5 and the first recess 6 closed by the outer housing 5.

That is, in this embodiment, the piston 25 separates the first recess 6, which is closed by the outer housing 5, from the interior space of the outer housing 5. The thus configured first recess 6 functions as a decompression chamber 26. Hydrogen gas in the valve chamber 16 flows into the decompression chamber 26 through the through hole 18 formed in the lid body 13, and is supplied to the outside through the outflow passage 9 formed in the first recess 6 functioning as the decompression chamber 26.

On the other hand, a coil spring 28 is located in the interior space of the outer housing 5 defined by the piston 25. One end of the coil spring 28 contacts the piston 25. A spring seat 29 is fixed to the other end of the coil spring 28. The spring seat 29 contacts a distal end of an adjuster screw 31 extending through a bottom portion 30 of the outer housing 5. The piston 25 is urged toward the decompression chamber 26 by the elastic force of the coil spring 28.

That is, in this embodiment, the interior space of the outer housing 5 defined by the piston 25 functions as a pressure adjusting chamber 32, and a surface of the piston 25 corresponding to the pressure adjusting chamber 32 functions as a pressure adjusting surface 33. The piston 25 slides along the cylinder 24 according to the difference between the force received by the pressure adjusting surface 33 and the force received by the surface of the piston 25 that corresponds to the decompression chamber 26 (pressure receiving surface 34).

A valve stem 35 is inserted into the through hole 18, and is fixed to the pressure receiving surface 34 of the piston 25, thereby coupling the piston 25 to the valve body 20. In this embodiment, the valve body 20 and the valve stem 35 are integrally formed. The valve stem 35 transmits movement of the piston 25 to the valve body 20, so that the valve body 20 contacts or separate from the valve seat 19 located in the through hole 18. In this manner, the valve is opened or closed.

When the force received by the pressure receiving surface 34 is greater than the force received by the pressure adjusting surface 33, the piston 25 moves toward the pressure adjusting chamber 32. This causes the valve body 20 to contact the valve seat 19 (closes the valve), and the flow of hydrogen gas from the valve chamber 16 to the decompression chamber 26 is stopped. When the force received by the pressure receiving surface 34 is less than the force received by the pressure adjusting surface 33, the piston 25 moves toward the decompression chamber 26. This causes the valve body 20 to separate from the valve seat 19 (opens the valve), and hydrogen gas flows from the valve chamber 16 to the decompression chamber 26.

In this manner, the piston 25 slides according to the difference between the force received by the pressure adjusting surface 33 and the force received by the pressure receiving surface 34, thereby causing the valve body 20 and the valve seat 19, which form the valve, to contact or separate from each other (open or close). Accordingly, the gas pressure in the decompression chamber 26 is balanced with the pressure received by the pressure adjusting surface 33. As a result, the pressure of hydrogen gas supplied to the outside through the outflow passage 9 (secondary pressure) is reduced from the primary pressure, or the pressure in the hydrogen tank, to a predetermined pressure that has been set by the adjuster screw 31 and the coil spring 28.

(Structure for Preventing Excessive Movement of Piston)

A structure for preventing the piston 25 of the pressure reducer according to the present embodiment from moving by an excessive amount will now be described.

As shown in FIG. 2, the pressure reducer 1 of this embodiment has a lip seal 37 provided on an outer circumferential surface 25a of the piston 25. The lip seal 37 seals the decompression chamber 26 and the pressure adjusting chamber 32 from each other. In this embodiment, the structure of the lip seal 37 and its arrangement with the piston 25 are the same as those of a comparison example illustrated in FIG. 3. The comparison example of a pressure reducer 41 includes a piston 46 having a lip seal 42.

As illustrated in FIGS. 2 and 3, the lip seal 37 (42) includes a resin ring member 43 having a U-shaped cross-section, and an elastic member, which is a leaf spring 45 provided in a recess 44 of the ring member 43. The lip seal 42 is fitted in a first accommodation groove 48 formed in the outer circumference of a piston 25 (46) and is secured to the piston 25 with a fastening nut 49. The elasticity of the leaf spring 45 presses a seal lip 47 of the ring member 43 against a cylinder inner circumferential surface 24a, so that the seal lip 47 slides on the cylinder inner circumferential surface 24a. Accordingly, a decompression chamber 26 and a pressure adjusting chamber 32 are sealed from each other. In this manner, even if high-pressure gas is used, a sufficient sealing performance is obtained while permitting a piston 25 to move by using a lip seal 42 as a seal member.

When the lip seal 37 is used as a seal member for the piston 25 in a pressure reducer for high-pressure gas such as the pressure reducer 1 of this embodiment, the pressing force with which the seal lip 47 is pressed against the inner circumferential surface 24a of the cylinder 24 is inevitably increased. Therefore, when there is a change in the difference between the primary pressure and the secondary pressure, the piston 25 abruptly moves after a delay. This is a phenomenon that occurs due to the difference between static friction force between the seal lip 47 and the inner circumferential surface 24a of the cylinder 24 prior to the movement of the piston 25 and the dynamic friction force between these components after the start of the movement. That is, even if the difference between the primary pressure and the secondary pressure increases due to decrease of the secondary pressure, the piston 25 does not start moving right away since the coefficient of static friction between the seal lip 47 and the inner circumferential surface 24a of the cylinder 24 is great. When the pressure difference is further increased, and the piston 25 starts moving, the friction force between the seal lip 47 and the inner circumferential surface 24a of the cylinder 24 is switched to dynamic friction force and is instantly decreased. As a result, the accumulated pressure difference abruptly moves the piston 25. The tendency of abrupt movement of the piston 25 is particularly evident in a fuel cell vehicle in its state of usage, that is, in a condition where the gas pressure at the supplying side of the pressure reducer abruptly changes due to changes in the demanded amount of hydrogen gas (demanded driving force). The adjustment accuracy of gas pressure is thus degraded. This drawback may occur in the comparison example illustrated in FIG. 3.

In consideration of this, the pressure reducer 1 of the present embodiment illustrated in FIG. 2 has an O-ring 38 on the outer circumferential surface 25a of the piston 25. The O-ring 38 functions as an annular member that prevents the piston 25 from moving excessively. Accordingly, when the piston 25 starts moving, in addition to the dynamic friction force between the seal lip 47 and the inner circumferential surface 24a of the cylinder 24, friction force between the O-ring 38 and the inner circumferential surface 24a of the cylinder functions to prevent abrupt movement of the piston 25. As a result, excessive movement of the piston 25 is prevented.

Specifically, the O-ring 38 is accommodated in a second accommodation groove 39 formed in the outer circumferential surface 25a of the piston 25, such that the O-ring 38 is located on the outer circumferential surface 25a closer to the pressure adjusting chamber 32 than the lip seal 37 is to the pressure adjusting chamber 32.

Like the seal member, the O-ring 38 of this embodiment is formed of an elastic material such as rubber or elastomer. The compressibility of the O-ring 38 (the ratio of compressibility when compressed in the second accommodation groove 39 by the inner circumferential surface 24a of the cylinder 24) is lower than that of the seal member. Specifically, while the compressibility of the seal member is normally approximately 25 to 30%, the compressibility of the O-ring 38 of this embodiment is set to approximately 15% at the maximum (preferably, approximately 12%). If the compressibility exceeds 15%, the pressing force with which the O-ring 38 is pressed against the inner circumferential surface 24a is increased, and the contacting area of the O-ring 38 on the inner circumferential surface 24a is increased. Accordingly, static friction force applied to the O-ring 38 is increased, which increases the fluctuation of the friction force of the O-ring 38 when the piston 25 starts moving. Thus, excessive movement of the piston 25 is not reliably prevented. The compressibility required for permitting the O-ring 38 to reliably slide on the inner circumferential surface 24a of the cylinder 24 is approximately 8%. This is because if the compressibility is less than 8%, friction force required for preventing excessive movement of the piston 25 cannot be obtained. The compressibility refers to a quotient obtained by dividing the amount of decrease of the thickness of the O-ring 38 by the thickness of the O-ring 38 before being compressed. The compressibility corresponds to compressive strain ratio or crushing rate. The elastic pressure of the O-ring 38, or the force with which the O-ring 38 presses the inner circumferential surface 24a of the cylinder 24, is set lower than the elastic force of the leaf spring 45, which is an elastic member in the lip seal 37. That is, the O-ring 38 is pressed against the inner circumferential surface 24a of the cylinder 24 with a force that is less than the force with which the leaf spring 45 presses the lip seal 37 against the inner circumferential surface 24a of the cylinder 24.

Problem-causing excessive movement of the piston 25 is caused in the following manner. Since the seal lip 47 functioning as a sliding portion is pressed against the inner circumferential surface 24a of the cylinder 24 by the elastic force of the leaf spring 45, the piston 25 starts moving with a slight delay. The slight delay accumulates energy (the difference between the forces received by the pressure adjusting surface 33 and the pressure receiving surface 34) that moves the piston 25 by an excessive amount in the leaf spring 45. Thus, the excessive movement can be prevented by consuming, while the piston 25 moves, the excessive energy resulting from the slight delay.

Accordingly, the pressure reducer 1 of this embodiment has the O-ring 38 on the outer circumferential surface 25a of the piston 25. The O-ring 38 slides on the inner circumferential surface 24a of the cylinder 24, so that, when the piston 25 moves, excessive energy that causes excessive movement of the piston 25 is consumed by the friction between the O-ring 38 and the inner circumferential surface 24a of the cylinder 24. This prevents the piston 25 from moving excessively. As a result, highly accurate pressure adjustment is performed even if the gas pressure at the supplying side fluctuates rapidly.

The present embodiment has the following advantages.

(1) The pressure reducer 1 has the lip seal 37 provided on the outer circumferential surface 25a of the piston 25. The lip seal 37 seals the decompression chamber 26 and the pressure adjusting chamber 32 from each other. The O-ring 38 functioning as the annular member is provided on the outer circumferential surface 25a of the piston 25, and the O-ring 38 slides on the inner circumferential surface 24a the cylinder 24.

This configuration permits excessive energy that causes excessive movement of the piston 25 to be consumed by the friction force of the O-ring 38 that slides on the inner circumferential surface 24a of the cylinder 24 when the piston 25 moves. This prevents the piston 25 from moving excessively. As a result, highly accurate pressure adjustment is performed even if the gas pressure at the supplying side fluctuates rapidly.

(2) The elastic pressure with which the O-ring 38 presses the inner circumferential surface 24a of the cylinder 24 is set lower than the elastic force of the leaf spring 45 in the lip seal 37. This configuration prevents movement of the piston 25 from being disturbed at the beginning.

(3) The O-ring 38 is arranged closer to the pressure adjusting chamber 32 than the lip seal 37 is to the pressure adjusting chamber 32.

Not only the pressure reducer 1 of this embodiment, but also many pressure reducers are open-to-atmosphere type having a pressure adjusting chamber 32 and a through hole 40 (see FIG. 1) connecting the pressure adjusting chamber 32 with the outside. This configuration may allow foreign matter to enter the pressure adjusting chamber 32 and the space between the piston 25 and the cylinder 24 through the through hole 40. In this respect, the above illustrated configuration has the O-ring 38 that prevents foreign matter from reaching the lip seal 37. Accordingly, the sealing performance of the lip seal 37 is prevented from deteriorating by stuck foreign matter.

The illustrated embodiment may be modified as follows.

In the illustrated embodiment, the O-ring 38 is provided as the annular member located on the outer circumferential surface 25a of the piston 25. However, the annular member may be any other component as long as it effectively consumes excessive energy that can cause excessive movement of the piston 25. For example, in place of the O-ring 38, the annular member may be a member that is made of a material other than elastic material and slides on the inner circumferential surface 24a of the cylinder 24.

In the illustrated embodiment, the present invention is applied to the pressure reducer 1 (regulator) that is used for a high-pressure hydrogen tank and is located in the plug housing 2 of the hydrogen tank. However, the present invention may be applied to a pressure reducer that is provided separately from the plug housing 2. The gas stored in the tank is not limited to hydrogen, but may be oxygen, compressed natural gas (CNG), or liquefied petroleum (LP) gas.

The invention claimed is:

1. A pressure reducer for reducing a pressure of high-pressure gas flowing in through a first port and sending the gas to a second port, the pressure reducer comprising:
   a valve located between the first port and the second port;
   a cylinder located downstream of the valve;
   a piston slidably accommodated in the cylinder to define a decompression chamber and a pressure adjusting chamber, wherein the piston has a pressure receiving surface exposed to the decompression chamber and a pressure adjusting surface exposed to the pressure adjusting chamber, wherein gas can flow into the decompression chamber from the first port through the valve, wherein the piston moves in the cylinder according to a difference between a force received by the pressure receiving surface and a force received by the pressure adjusting surface, thereby selectively opening and closing the valve; and
   a lip seal disposed on an outer circumferential surface of the piston,
   wherein the lip seal is fitted in an accommodation groove formed in the outer circumferential surface of the piston and is secured to the piston with a fastening nut,
   wherein the lip seal includes an elastic member and a sliding portion, the sliding portion being pressed by the elastic member such that the sliding portion slides on an inner circumferential surface of the cylinder,
   wherein an annular member is located on the outer circumferential surface of the piston between the lip seal and the pressure adjusting surface, the annular member sliding on the inner circumferential surface of the cylinder, the annular member having elasticity,
   wherein the annular member is formed of a rubber or elastomer to include a compressibility as the elasticity in a range from 8% to 15%, such that the annular member prevents the piston from moving abruptly upon a change in a demand for gas, caused when the force received by the pressure receiving surface overcomes a frictional force of the lip seal against the inner circumferential surface of the cylinder,
   wherein the annular member is compressed by the inner circumferential surface of the cylinder, and
   wherein the compressibility of the annular member is obtained by dividing an amount of decrease of a thickness of the annular member by a thickness of the annular member before being compressed, such that by a dynamic friction force between the sliding portion and the inner circumferential surface of the cylinder and by a friction force between the annular member and the inner circumferential surface of the cylinder, an abrupt movement of the piston, which takes place due to an abrupt change of the gas pressure at a supplying side of the pressure reducer is prevented.

2. The pressure reducer according to claim 1, wherein the annular member is an O-ring.

3. The pressure reducer according to claim 2, wherein an entire circumference of the annular member slides on the inner circumferential surface of the cylinder.

4. The pressure reducer according to claim 1, wherein an entire circumference of the annular member slides on the inner circumferential surface of the cylinder.

5. The pressure reducer according to claim 1, wherein the compressibility of the annular member is 12%.

6. The pressure reducer according to claim 1, wherein the annular member is pressed against the inner circumferential surface of the cylinder with a force that is less than a force with which the lip seal is pressed against the inner circumferential surface of the cylinder.

7. The pressure reducer according to claim 1, wherein the compressibility is a compressive strain ratio or a crushing rate.

8. The pressure reducer according to claim 1, wherein the valve includes a valve stem that is fixed to the pressure receiving surface of the piston.

9. The pressure reducer according to claim 8, wherein the valve includes
   a valve body connected to the valve stem, and
   a valve seat that is located between the valve stem and the valve body, and the valve body is contactable with and separable from the valve seat.

10. The pressure reducer according to claim 9, wherein the valve includes a structure that connects the valve stem and the valve body, the structure includes a width perpendicular to a sliding direction of the piston that is smaller than a corresponding width of the valve stem and that is smaller than a corresponding width of the valve body, the structure passes through a through hole in a lid of the valve, and the valve seat is formed in a section of the through hole.

11. A pressure reducer for reducing a pressure of high-pressure gas flowing in through a first port and sending the gas to a second port, the pressure reducer comprising:
   a valve located between the first port and the second port;
   a cylinder located downstream of the valve;
   a piston slidably accommodated in the cylinder to define a decompression chamber and a pressure adjusting chamber, wherein the piston has a pressure receiving surface exposed to the decompression chamber and a pressure adjusting surface exposed to the pressure adjusting chamber, wherein gas can flow into the decompression chamber from the first port through the valve, wherein the piston moves in the cylinder according to a difference between a force received by the pressure receiving surface and a force received by the pressure adjusting surface, thereby selectively opening and closing the valve; and
   a seal member disposed on an outer circumferential surface of the piston,
   wherein the seal member includes an elastic member and a sliding portion, the sliding portion being pressed by the elastic member such that the sliding portion slides on an inner circumferential surface of the cylinder,
   wherein an annular member is located on the outer circumferential surface of the piston between the seal member and the pressure adjusting surface, the annular member sliding on the inner circumferential surface of the cylinder, the annular member having elasticity, wherein the annular member is formed of a rubber or elastomer to include a compressibility as the elasticity in a range from 8% to 15%, such that the annular member prevents the piston from moving abruptly upon a change in a demand for gas, caused when the force received by the pressure receiving surface overcomes a frictional force of the seal member against the inner circumferential surface of the cylinder, wherein the annular member is compressed by the inner circumferential surface of the cylinder, and wherein the compressibility of the annular member is obtained by dividing an amount of decrease of a thickness of the annular member by a thickness of the annular member before being compressed, such that by a dynamic friction force between the sliding portion and the inner circumferential surface of the cylinder and by a friction force between the annular member and the inner circumferential surface of the cylinder, an abrupt movement of the piston, which takes place due to an abrupt change of the gas pressure at a supplying side of the pressure reducer is prevented.

12. The pressure reducer according to claim 11, wherein an entire circumference of the annular member slides on the inner circumferential surface of the cylinder.

13. The pressure reducer according to claim 11, wherein the compressibility of the annular member is 12%.

14. The pressure reducer according to claim 11, wherein the annular member is pressed against the inner circumferential surface of the cylinder with a force that is less than a force with which the seal member is pressed against the inner circumferential surface of the cylinder.

15. The pressure reducer according to claim 11, wherein the compressibility is a compressive strain ratio or a crushing rate.

16. The pressure reducer according to claim 11, wherein the valve includes a valve stem that is fixed to the pressure receiving surface of the piston.

17. The pressure reducer according to claim 16, wherein the valve includes
a valve body connected to the valve stem, and
a valve seat that is located between the valve stem and the valve body, and the valve body is contactable with and separable from the valve seat.

18. The pressure reducer according to claim 17, wherein the valve includes a structure that connects the valve stem and the valve body, the structure includes a width perpendicular to a sliding direction of the piston that is smaller than a corresponding width of the valve stem and that is smaller than a corresponding width of the valve body, the structure passes through a through hole in a lid of the valve, and the valve seat is formed in a section of the through hole.

19. The pressure reducer according to claim 11, wherein the seal member is a lip seal.

* * * * *